Nov. 28, 1967     E. EISNER     3,354,702
INTERFEROMETRIC STRAIN ANALYSIS
Filed May 4, 1965     2 Sheets-Sheet 1
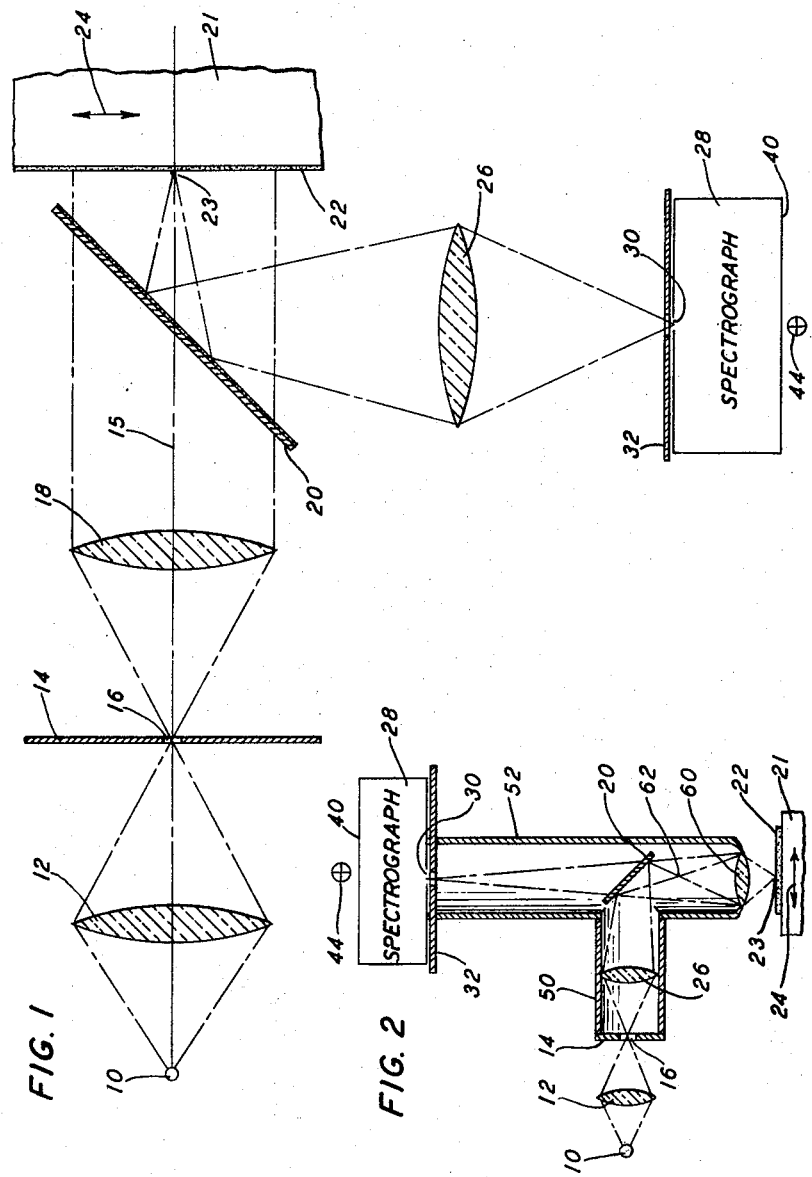
INVENTOR
E. EISNER
BY
*H. O. Wright*
ATTORNEY

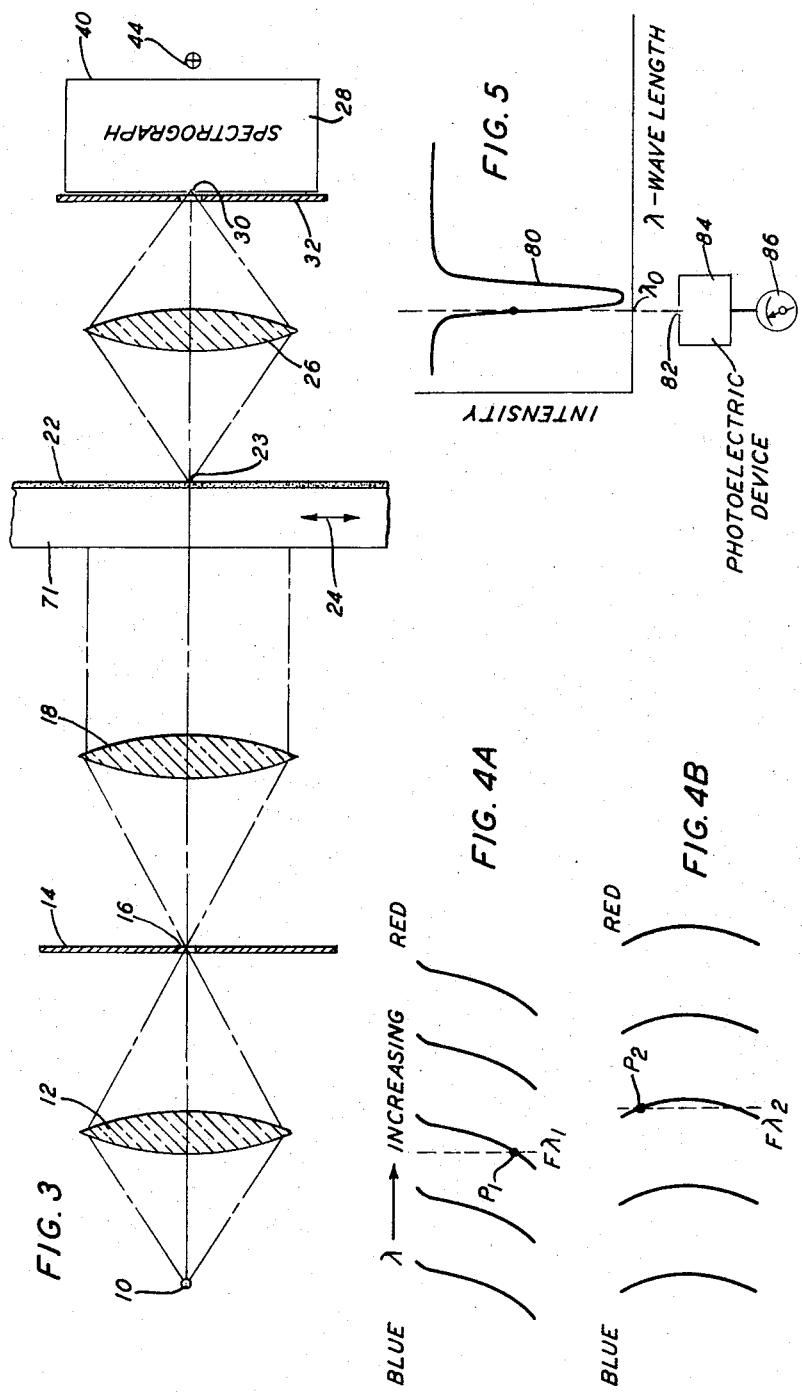

United States Patent Office 3,354,702
Patented Nov. 28, 1967

3,354,702
INTERFEROMETRIC STRAIN ANALYSIS
Edward Eisner, Gillette, N.J., assignor to Bell Telephone Laboratories, Incorporated, New York, N.Y., a corporation of New York
Filed May 4, 1965, Ser. No. 453,137
4 Claims. (Cl. 73—88)

This invention relates to methods and arrangements for the optical measurement of strain. More particularly, it relates to the use of interferometry to obtain information relative to the distribution of strain over an area of an object when the latter is subjected to irregularly distributed forces.

The methods and arrangements of the invention provide information concerning at least the sum of the principal strains at each point of a surface area of an object which is being subjected to irregularly distributed forces. As will become apparent hereinbelow, under certain circumstances appreciable information in addition to the sum of the principal strains can be derived.

The methods and arrangements of the invention provide information complementary to the information relative to the difference between the principal strains at each point of a surface area of such an object, obtainable by so-called photoelastic methods and arrangements.

Reference may be had, inter alias, to the application of R. O'Regan, Ser. No. 296,005, filed July 18, 1963, which matured as Patent 3,178,934, granted April 20, 1965, and the publications referred to therein for information descriptive of photoelastic methods and arrangements.

The methods and arrangements of the present invention resemble those of the O'Regan patent in that a coating or layer of transparent material may be evaporated upon or otherwise firmly secured to a surface area of an object over which the distribution of strain is to be ascertained. Also in common with the methods and arrangements of O'Regan, a transparent model having the configuration of an object in which the distribution of strain is to be determined may be employed and light transmitted through the model (as contrasted with employing reflected light) may be analyzed to obtain information relating to the distribution of strain throughout the model.

However, for the principal purposes of the present invention, as will become apparent from the description hereinunder, the layer need not have the property of becoming birefringent and particularly not birefringent to a degree proportional to the strain to which it is subjected. Furthermore, as will be discussed in detail hereinbelow, a much thinner layer, having highly reflective coatings on both major surfaces of the layer, is employed in place of the relatively much thicker layer of birefringent photoelastic material employed for the purposes of photoelastic strain analysis.

A limited use for the purpose of strain analysis of certain of the basic principles upon which the methods and arrangements of the present application depend has been previously suggested by a number of individuals. Reference may be had, for example, to a paper by H. Favre and W. Schumann entitled "A Photoelectric-Interferometric Method to Determine Separately the Principal Stresses in Two-Dimensional States and Possible Applications to Surface and Thermal Stresses" presented at an international symposium on photoelasticity held at the Illinois Institute of Technology, Chicago, Ill., in October 1961. The proceedings of the symposium including the above-mentioned paper were published by the Pergamon Press of Oxford, London, New York and Paris in 1963 in book form entitled "Symposium on Photoelasticity," edited by M. M. Frocht. The paper appears on pages 3 through 25, inclusive, of this book. A comprehensive list of nineteen prior art publications relating to the subject matter of the paper is given on page 25. Insofar as they are pertinent to the subject matter of the present application, the paper and the above-mentioned list of publications are incorporated by reference as an integral part of the disclosure of the present application.

It is noted, however, from FIG. 2, page 6 of the above-mentioned paper by Favre and Schumann, that their method involves only what is known to those skilled in the art as "two-beam" interference. As discussed, for example, in S. Tolansky's book entitled "Multiple-Beam Interferometry of Surfaces and Films," published by The Clarendon Press, Oxford, England, 1948, pages 1 through 4, this method produces very broad fringes. The method therefore is rather insensitive.

In contrast to this, the present application proposes, as will subsequently become apparent, methods of strain analysis employing the application of the principle of "multiple beam" interference as discussed, for example, in Tolansky's book, mentioned above, Chapter II, pages 8 through 23.

Multiple beam interference can produce, as Tolansky illustrates and as is well known in the art, very sharp fringes.

Because the fringes are very sharp, the sensitivity of the methods and arrangements is great.

Because the sensitivity is great, the thickness of the layer of transparent isotropic material employed can be made very small for a given strain sensitivity.

Because the thickness of the layer can be made very small, a very much smaller region can be examined for the purpose of strain analysis than can be examined by any known prior are method.

As will be explained in detail hereinbelow, the virtues of the methods and arrangements of the invention are in general enhanced by the use of a source of a continuous band of polychromatic light, for instance white light, to give fringes of equal chromatic order. See, for example, Tolansky's book, supra, Chapter IX.

There may be circumstances, however, particularly when for instance in dynamic measurements it is vital to examine a whole area at one moment, rather than a series of single lines of a surface, one at a time, that the use of a monochromatic source to give localized Fizeau fringes (see, for example, Tolansky's book, supra, Chapter II) would be preferred. Such an arrangement would involve no new differences of principle from the arrangements described hereinafter, which employ a continuous band of polychromatic light and the slight changes needed will be obvious to those skilled in the art of interferometry. The use of monochromatic fringes will, however, almost always yield lower sensitivity and accuracy, and give more difficulty in interpretation than will fringes of equal chromatic order. Therefore, further explanation in the present application will emphasize arrangements using fringes of equal chromatic order.

Interferometry has, of course, long been employed by those skilled in the art to study surface topography and thin films down to molecular dimensions. High magnification and high resolution can be achieved and surface irregularities as small as five Angstrom units or even smaller can, under appropriate conditions, be accurately determined.

Further reference may be had, for example, to the book by S. Tolansky mentioned above for an elementary and lucid exposition of the basic theoretical considerations and of a number of proir art applications of interferometry. A second elementary text of interest in this connection is the more recent book entitled "Wave Optics, Interference and Refraction" by C. Curry, published by Edward Arnold, Ltd., London, England, 1957.

An erudite exposition on elasticity is that by A. E. H. Love, entitled "A Treatise on the Mathematical Theory of Elasticity," published in 1927 by the Cambridge University Press, England. A less mathematical treatise is that by J. C. Jaeger, entitled "Elasticity and Strength," 2nd Edition, published by Methuen and Co., Ltd., London, England, in 1962. The book by Timoshenko and Goodier noted in the above-mentioned patent of O'Regan is also of interest.

Since, as will presently be discussed in detail, the interference phenomena in each instance are affected by the refractive index and the thickness of the thin layer of suitable material, and subjecting such a thin layer to a given pattern of strains in the plane of the layer produces substantially proportional changes from point to point of the layer in the refractive index and the thickness, the present invention is directed to several arrangements utilizing the interference phenomena to obtain information indicative of the pattern of strains to which the layer is subjected.

As stated above, this information relates at least to the sum of the principal strains at each point and is therefore complementary to the information, namely, that relating to the difference between the principal strains at each point, obtainable by photoelastic methods of strain analysis, such, for example, as those proposed in the above-mentioned patent of O'Regan.

A principal object of the invention is, accordingly, to facilitate the determination of the strains resulting at all or numerous points on a surface of an object when the object is subjected to a complex assortment of forces in the plane of the surface.

A further object of the invention is to facilitate the determination of the sum of the principal strains at numerous points on a surface of an object when the object is being subjected to an assortment of irregularly distributed forces.

A still further object is to make possible the determination of strains over much smaller areas than can be determined by prior art methods.

Other and further objects, features and advantages of the invention will become apparent from a perusal of the following specification and the appended claims taken in conjunction with the accompanying drawings, in which:

FIG. 1 diagrammatically and schematically illustrates the essential features of a combination including an interferometer and a spectrograph suitable for purposes of the present invention when reflected light is to be used;

FIG. 2 diagrammatically and schematically illustrates the essential features of a second form of a combination including an interferometer and a spectrograph also employing reflected light in practicing particular principles of the present invention;

FIG. 3 diagrammatically and schematically illustrates the essential features of a further form of a combination including an interferometer and a spectrograph employing the light transmitted through a transparent member in practicing particular principles of the present invention;

FIG. 4A is illustrative of an array of fringes of equal chromatic order which were obtained in a specific instance for a specific line on an area of an object under examination by a system of the invention when the object under examination was in an unstrained condition;

FIG. 4B is illustrative of a second array of fringes of equal chromatic order which were obtained for the same specific line on the same area of the same object as for FIG. 4A when the object was being subjected to an array of strains; and FIG. 5 is illustrative of the possibility of obtaining an extremely high degree of sensitivity to strain with arrangements of the invention by employing a device responsive to the itensity of light at a particular point located on the edge of a fringe for a prescribed condition of strain such, for example, for the no-strain condition.

Interferometry and spectrography are, of course, highly developed arts well known and extensively used by numerous and sundry scientists. Many refinements and improvements respecting the detailed construction of arrangements used in practicing these arts have been comprehensively covered in a large number of well known publications including the references listed hereinabove. Accordingly, the following descriptions are related for specific illustrative structural arrangements indicative of numerous and varied other arrangements well known and extensively used by those skilled in the art, which may be employed in practicing the principles of the present invention. Under the above circumstances, the descriptions will be rudimentary in nature omitting much well known detail, it being understood that those skilled in the art need no instruction in order to incorporate the many readily available refinements of detail which in each or any specific instance will be obvious to those skilled in the art.

In more detail in FIG. 1, source 10 is preferably a source which may provide "white" light or, alternatively, light having a continuous band of frequencies of light extending over an appreciable range. Suitable sources, for example, are a tungsten strip or filament heated to incandescence or, preferably, an xenon or carbon arc.

A condensing lens 12 focuses light from source 10 on a small circular aperture or orifice 16 of the otherwise opaque plate 14.

Aperture 16 is also at a focal point of the high quality collimating lens 18 so that the light passing through aperture 16 is converted by lens 18 into a beam of light of substantially parallel rays directed to pass through the partially reflecting plate 20 placed at an angle of 45 degrees with respect to the axis 15 of the beam, as shown, and preferably to impinge normally on a surface of the coating 22. Other impinging angles may be employed, as is well known to those skilled in the art. In any case, the impinging angle must be accurately known and maintained. Coating 22 is applied to a surface of an opaque object 21 as indicated, the ultimate purpose being, of course, to obtain information relative to the strain distribution over the coated surface of the object when the object is subjected to a number of dissymmetrically applied forces.

Coating 22 is a thin layer of transparent material such, for example, as lithium fluoride if it is evaporated upon the surface, or polyethylene terephthalate ("Mylar" or "Melinex") if it is glued in place. It should be as uniform as possible, both in thickness and refractive index, in the unstrained state. Its thickness should, for example, be in the order of 0.02 millimeter. As mentioned hereinabove, the material of coating 22 need not, except in unusual instances, have the property of becoming birefringent in proportion to the applied stress. In general, as will be discussed in more detail hereinbelow, its thickness will be sufficiently small that no appreciable effects of birefringence will ordinarily be evident whatever material is used. For the purposes of the present invention, both major surfaces of coating 22 are made highly reflective by covering them either with deposits of silver (see, for example, Tolansky, supra, Chapter III) or with multiple dielectric layers (see, for example, A. Vašíček, "Optics of Thin Films," North-Holland Publishing Co., Amsterdam, 1960). Each surface should, consistently with the two following conditions, reflect as high a proportion as possible (and certainly not less than 94 percent) of the light impinging upon its upper surface. When the coating 22 is applied, as in FIG. 1, to an opaque object and is then examined by reflected light, then the outer reflective layer should, furthermore, also transmit at least half of the light that is not reflected from it. When transmission is used, as will be discussed below in connection with FIG. 3 (in which the object being examined is transparent), both surfaces must transmit a little light, but the amount is in such a case not nearly as critical since the contrast between the fringes and the background is appreciably greater in such a case.

As is well known in the art, the application of highly reflective surfaces on coating 22 will result in the phenomenon commonly referred to as "multiple-beam reflection" whereby extremely sharp fringes of either reflected or transmitted light will be obtained.

For investigation and analysis of the strain distribution over the whole coated surface of the object 21, means, not shown, are provided for moving the coated object, in the direction indicated by the double-headed arrow 24, for reasons which will presently become apparent. Alternatively, if an inconveniently bulky object is being examined, the optical system may be moved in the direction indicated by arrow 24 while the object 21 remains still.

Light, indicated by broken lines, reflected from a narrow line 23 perpendicular to the plane of the drawing, is reflected by plate 20 and focused by lens 26 on a narrow slit 30 at the entrance to the spectrograph 28, as shown, the slit 30 being also perpendicular to the plane of the drawing. This arrangement obviously makes possible the examination of the characteristics over a very narrow line along the surface of the object. A conventional type of shutter 32 is provided where successive photographs are to be made of the patterns of fringes for successive positions, respectively, of object 21, as will be discussed in more detail hereinunder.

The slit 30 may, alternatively, be the entrance slit of a conventional spectroscope if visual observation is deemed sufficient and photographic recording is not needed, but in most cases it is preferably a conventional spectrograph 28. This spectrograph must be of such a kind that each small region in its image surface 40 is an image of a small region on the slit in light of some particular small wavelength range. Conventional prism spectrographs are the most common examples of this type. The image surface of the spectrograph 28, where a photographic plate or film is placed, may be considered as being at surface 40. On this surface, as is well known to those skilled in the art, dark fringes on a lighter background will appear in the reflecting arrangements shown in FIGS. 1 and 2, while bright fringes on a darker background will appear when transmission is used as in the arrangement of FIG. 3. These fringes will not in general be straight, but there will be a one-to-one correspondence of points on any one fringe with points on the slit and therefore also with points along line 23 on the coating 22 and on the object 21. As will be explained in detail below, the movement of such a fringe as the object 21 is strained can be analyzed to give the sums of the principal strains at all points on the object corresponding to points on the slit 30.

Conventional means 44, not shown, but indicated by the small circle enclosing a plus sign (signifying a departing arrow), is further provided for moving the plate or film at surface 40 in a direction parallel to the length of the slit 30 (viz., perpendicular to the plane of the paper) through distances sufficient to avoid overlapping of successive fringe patterns when a succession of patterns is to be photographed.

Conventional means, not shown, may then be provided interconnecting means 24, 44 and shutter 32 so that for successive positions of the coated object 21 successive fringe patterns corresponding to successive images of the line 23 will be photographed at successive positions on the plate or film on surface 40, so that fringes corresponding to reflections from substantially the entire coated surface of object 21 may be recorded in appropriate alignment on the plate or film on surface 40.

Numerous and varied arrangements for effecting such synchronized movements with appropriate shutter operations are, of course, well known and extensively used by those skilled in the art so that a detailed description of such an arrangement is not deemed to be necessary here. Alternatively, equivalent results can obviously be obtained by manual adjustments of the positions of the specimen and film and manual operation at appropriate times of the shutter. The system indicated obviously provides for scanning the entire coated area of object 21, line by line. Portions or the whole of over-all characteristics thus recorded for conditions of strain in object 21 may then be compared with the corresponding characteristics obtained when the object 21 is free from strain to obtain information regarding the sums of the principal strains at substantially all points of the coated area for the various strain conditions to which the object 21 is subjected. Typical fringe patterns are illustrated in FIGS. 4A and 4B and will be discussed in more detail hereinunder.

In FIG. 2 an arrangement for practicing the invention which embodies a simple microscope is schematically illustrated. Members substantially equivalent functionally to corresponding members of the arrangement of FIG. 1 are given corresponding designation numbers and each may be substantially as described in detail above in connection with FIG. 1 for its correspondingly numbered counterpart.

In FIG. 2, however, a tubular arm 50 joining at its right end the main tubular housing 52 of the simple microscope at right angles thereto, as shown, includes within it the focusing lens 26 and at its left end a closure plate 14 having a small circular orifice 16 at the center of the plate.

Light from focusing lens 26 is deflected by the partially reflecting plate 20 so as to come to focus at point 62 which is also a focal point of the objective lens 60 of the microscope.

In this arrangement, objective lens 60 further serves the additional function of collimating the light reaching it from focal point 62 so that a beam of parallel rays is caused to impinge normally with respect to the coating 22 on the surface of the test object 21.

Light reflected from line 23 on coating 22 is, as indicated by the broken lines, in turn focused by objective lens 60 on the narrow slit 30 in spectrograph 28. A shutter 32 is provided and the remaining details and over-all operation of the arrangement of FIG. 2 are, obviously, essentially the same as for that of FIG. 1. The incorporation of the microscope, however, permits a substantial magnification to be introduced in the fringe pattern obtained. It is obvious that a compound microscope could readily be used especially if high magnification is desired.

In FIG. 3 a third arrangement is schematically illustrated and differs from those of FIGS. 1 and 2 in that the object 71 to be tested is transparent and freely transmits the light instead of reflecting it. As mentioned hereinabove, the pattern of fringes for an arrangement such as that illustrated in FIG. 3 will consist of bright lines on a dark background instead of dark lines on a light background. As indicated by the designation numbers, all elements of the arrangement of FIG. 3 may be substantially the same as the correspondingly numbered elements of FIG. 1, respectively, and can be as described in detail above in connection with FIG. 1.

Actually, for all three arrangements of FIGS. 1, 2 and 3, the focusing lens 26 (FIGS. 1 and 3) and 60 (FIG. 2) projects a complete image of the entire area illuminated by the collimated beam on the nearer surface of shutter 32 so that the position of the line of this image selected by narrow slit 30 with respect to the area illuminated can be readily observed if a suitable surface is provided on the face of the shutter upon which the image may be projected and a few appropriate orientation marks are present on the area illuminated.

FIG. 4A illustrates a specific pattern of fringes of equal chromatic order obtained when the object being examined is not subjected to strain and FIG. 4B illustrates the change effected in the pattern of fringes by subjecting the object to the strains which are to be determined.

In these patterns, the wavelength of the light progressively changes from fringe to fringe; for example, it may ncrease from light of bluish hue at the left to light of reddish hue at the right.

Let us suppose that the pattern of fringes on the focal surface 40 of the spectrograph is as shown in FIG. 4A when the object 21 is unstrained and as shown in FIG. 4B when it is strained. Let us further suppose that we can identify a particular fringe, F, of order number $n$ (this term is defined below) in the two patterns, either by having observed the pattern continually as strains are established in objects 21 or 71, or by determining the order number $n$ from the patterns themselves, by a procedure well known to those skilled in the art of interferometry. Let us lastly suppose that the spectrograph is accurately calibrated and that it is known (as can readily be ascertained by observing the image on the shutter surface 32 of spectrograph 28) that points $P_1$, $P_2$ on FIGS. 4A and 4B, respectively, both correspnod to a particular point, P, on the objects 21 or 71. Then, from the calibration of the spectrograph, two accurately known wavelengths, $\lambda_1$ and $\lambda_2$, may be associated with points $P_1$ and $P_2$, respectively. In all likely arrangements $|(\lambda_2 - \lambda_1)|$ will be very much smaller than $\lambda_1$ (corrections for departures from this condition if appropriate will be readily apparent to those skilled in the art). It can then be shown that $$(\lambda_2 - \lambda_1)/\lambda_1 = KS \qquad (1)$$

where $S$ is the sum of the principal strains at the point P on the object 21 and K is a constant that depends on the properties of the coating 22 and its reflecting surfaces and on the angle of incidence, which is maintained constant during a measurement. K may be determined either by calculation or, usually more accurately and conveniently, by calibration. It is of the order of one. The sign of K is positive if S is a compressive strain.

It is well known to those skilled in optics that the minima of dark multiple-beam reflection fringes and the maxima of bright transmission fringes occur at wavelengths $\lambda$ for which $$2(\mu t + \tau) = n\lambda \qquad (2)$$

where $\mu$ is the refractive index and $t$ the thickness of the interferometer (in our case the coating 22) and $n$ is a positive integer. $\tau$ expresses the fact that there is a phase change, not equal to 0 or $\pi$, on reflection at the reflective coatings of the interferometer (see, for instance, Eisner, E., Research, 4, 183 (1951)). In the present application $\tau$ will be small compared with $\mu t$.

$n$ is then known as "the order of interference." It increases by one from one fringe to the next in going towards light of shorter wavelength.

It can be shown that, by the technique described above, the minimum detectable change in strain, $\Delta S$ would be about $$|\Delta S| = 0.03 \ (1 - \sqrt{R_1 R_2})/n \qquad (3a)$$

where $R_1$, $R_2$ are the reflectivities (from within the coating) of the two surfaces of the coating 22. With modern techniques reflectivities as high as 0.998 are attainable, whence $$|\Delta S| = 6 \times 10^{-5}/n \qquad (3b)$$

Thus, the larger $n$, the more sensitive the method, but it is clear from Equation 2 that, the larger $n$, the thicker the coating 22. Tolansky (vide supra, Chapter II) explains how optical difficulties arise when the thickness of the interferometer gets too great. Furthermore, it is a principal advantage of the present method that the variation of strain in very small regions may be examined. It is clearly not significant to use the method for regions smaller than the thickness of the coating 22. For these reasons, it is likely that $20 \leq n \leq 500$; this corresponds to $0.004 \ mm. \leq t \leq 0.1 \ mm.$ We see from Equation 3b that that would mean strain sensitivities from $3 \times 10^{-4}$ percent to $10^{-5}$ percent.

If very great sensitivity is required without increasing the thickness of the coating 22, then, if thermal and geometrical stability can be guaranteed, the photographic method of recording here described may be replaced by a photoelectric method illustrated schematically in FIG. 5. In this, use is made of the fact that the curve 80 of intensity against wavelength across a (reflection) fringe is as shown in FIG. 5, the intensity increasing in the upward direction of FIG. 5 when reflected light is used as in FIGS. 1 and 2, or decreasing in the upward direction of FIG. 5 when transmitted light is used as in FIG. 3. The intensity changes very rapidly (and nearly linearly) with wavelength (and therefore with strain, see Equation 1) in a small region on each side of the minimum. Photoelectric measurement of the intensity at a wavelength such as $\lambda_0$ by a photoelectric device 84 and indicator 86 therefore gives an extremely sensitive measure of change in strain. By this means it would be possible to increase the sensitivity at least tenfold over that given by Equation 3a and to have the advantage, if indicator 86 includes recording means, of direct electrical recording. The method would be particularly useful for measuring vibrational strains or other rapidly changing strains of moderate amplitude.

It remains to consider the influence of the strain birefringence, that is, of the ordinary photoelastic effect. (See O'Regan patent supra.) This causes a difference of refractive index to appear for waves polarized in the two principal directions of strain. This difference, if it is large enough, will cause each fringe in the unstrained state to split into two fringes. The separation of these fringes is of the order of one-tenth of the displacement of the fringes from the unstrained position. Thus, when the strain one is measuring is not more than ten times the minimum measurable strain, the birefringence has no appreciable effect. When it is between ten and fifty times the minimum measurable strain there is a gradual loss of absolute (though not, of course, of fractional) accuracy in the measurement of the sum of principal strains. At greater strains the fringe systems begin to separate, and the original accuracy is regained. Indeed, it then becomes easy to measure both the sum and the difference of the principal strains from the same interferogram, obtained with the same apparatus arrangements as, for example, those illustrated in FIGS. 1, 2 and 3, and even the directions of the principal strains, since these are the local directions of polarization in the individual fringes into which each "unstrained" fringe is split. If the two fringes are unresolved, this analysis may still be done by measuring the extreme fringe positions obtained with a rotating analyzer as taught by the O'Regan patent.

To recapitulate, application of the principles of the invention, as exemplified in the above-detailed descriptive and illustrative matter, makes possible the very sensitive determination of the sum of the principal strains at each and every point on the surface of an object to be examined. It permits the examination and determination of the sum of the principal strains at points much smaller than can be examined by any prior art means or method. Only relatively simple but highly accurate, well known and understood apparatus arrangements and operations are required and a considerable degree of "automation" in obtaining the fringe patterns is readily introduced, if desirable, so that actual operator's time required can be reduced to a minimum. In some instances the differences between the principal strains and even their directions can be ascertained by the arrangements of the invention.

Numerous and varied rearrangements and modifications of apparatus combinations and detailed method steps can readily be devised by those skilled in the art within the spirit and scope of the principles of the invention. No attempt to exhaustively cover all such possibilities has been made.

What is claimed is:

1. The method of obtaining the sum of the principal strains at numerous points on a surface of an object which comprises calibrating a specific transparent material for changes in thickness and refractive index with strain, coating the said surface of the object with a thin film of said transparent material, the thin film having a thickness of less than 0.1 mm. and having reflective coatings at least 94 percent reflecting on its major surfaces, applying in combination multiple-beam interferometric and spectroscopic techniques to obtain a first pattern of fringes of equal chromatic order for a first condition of strain on the object, subjecting the object to the strains to be investigated and repeating the application in combination of the said interferometric and spectroscopic techniques to obtain a second pattern of fringes of equal chromatic order whereby comparison of said first and said second patterns of fringes provides information relative to the sum of the principal strains at numerous points on the surface of the object.

2. The method of determining the sum of the principal strains at numerous points over an area on the surface of an object which is to be subjected to a plurality of dissymmetrically applied forces which comprises applying to the surface area a very thin uniform coating of a transparent material having a thickness of less than 0.1 mm. and having its front and rear surfaces treated to become at least 94 percent reflective to light, directing a collimated beam of light comprising a continuous band of frequencies throughout an appreciable range of frequencies, to impinge upon said very thin coating at a specific angle of incidence, recovering the light incident upon said thin layer after it has passed through said thin layer at least once, selecting the light from a thin line on the surface of said coating and subjecting it to spectroscopic analysis to obtain a first pattern of fringes subjecting the object to said dissymmetrically applied forces and repeating the spectroscopic analysis to obtain a second pattern of fringes whereby comparison of said first pattern with said second pattern provides indications of the sum of the principal strains at each point along said selected thin line.

3. A method of obtaining information concerning the principal strains at numerous points on a surface of an object which comprises calibrating a specific transparent material for changes in thickness, refractive index and birefringent properties with strain, coating the said surface of the object with a thin film of said transparent material, the thin film having a thickness of less than 0.1 mm. and having reflecting coatings at least 94 percent reflecting on its major surfaces, applying in combination multiple-beam interferometric and spectroscopic techniques to obtain a first pattern of fringes of equal chromatic order for a first condition of strain on the object, subjecting the object to the strains to be investigated and repeating the application in combination of the said interferometric and spectroscopic techniques to obtain a second pattern of fringes of equal chromatic order whereby comparison of said first and said second patterns of fringes provides information relative to the sum of the principal strains and the examination of split fringes of the second pattern of fringes provides information relative to the difference of the principal strains and their respective directions at numerous points on the surface of the object.

4. A method of obtaining information concerning the principal strains at numerous points on a surface of an object which comprises calibrating a specific transparent material for changes in thickness, refractive index and birefringent properties with a strain, coating the said surface of the object with a thin film of said transparent material, the thin film having a thickness of less than 0.1 mm. and having reflecting coatings at least 94 percent reflecting on its major surfaces, applying multiple-beam interferometric techniques to obtain a first pattern of fringes for a first condition of strain on the object, subjecting the object to the strains to be investigated and repeating the application of the said interferometric techniques to obtain a second pattern of fringes whereby comparison of said first and said second patterns of fringes provides information relative to the sum of the principal strains and the examination of split fringes of the second pattern of fringes provides information relative to the difference of the principal strains and their respective directions at numerous points on the surface of the object.

References Cited

UNITED STATES PATENTS

| 2,576,489 | 11/1951 | Stovall | 73—88 |
| 3,178,934 | 4/1965 | O'Regan | 73—8 |
| 3,238,839 | 3/1966 | Day | 88—1 |
| 3,246,558 | 4/1966 | Redner | 73—8 |

FOREIGN PATENTS

| 1,400,155 | 4/1965 | France. |
| 1,025,468 | 4/1966 | Great Britain. |

OTHER REFERENCES

Greenland, K. M., Measurement and Control of the Thickness of Thin Films, Vacuum, vol. 2, No. 3, 1953 pages 216, 217, 223–227.

Favre, H., & Schumann, W., A Photoelectric-Interferometric Method to Determine Separately the Principal Stresses in Two-Dimensional States and Possible Applications to Surface and Thermal Stresses—Published in Symposium on Photoelasticity, edited by Frocht, M. M., 1963.

RICHARD C. QUEISSER, *Primary Examiner.*

JAMES GILL, *Examiner.*

JAMES H. WILLIAMSON, *Assistant Examiner.*